D. WILCOX.
DIES FOR FORMING CARRIAGE STEPS.

No. 176,108. Patented April 11, 1876.

WITNESSES
Chas. J. Gooch
Le Blond. Burdett

INVENTOR
Darius Wilcox
By Knight Bros. Attorneys.

UNITED STATES PATENT OFFICE.

DARIUS WILCOX, OF BIRMINGHAM, CONNECTICUT, ASSIGNOR OF ONE-HALF HIS RIGHT TO ISAAC P. HOWE, OF SAME PLACE.

IMPROVEMENT IN DIES FOR FORMING CARRIAGE-STEPS.

Specification forming part of Letters Patent No. 176,108, dated April 11, 1876; application filed February 23, 1876.

*To all whom it may concern:*

Be it known that I, DARIUS WILCOX, of Birmingham, in the county of New Haven and State of Connecticut, have invented a certain new and useful Device for Forming Carriage-Steps, of which the following is a specification:

The object of my invention is to produce, by a swaging or stamping process, a carriage-step with raised points or projections, to afford a hold to the foot to prevent slipping.

Figure 1:
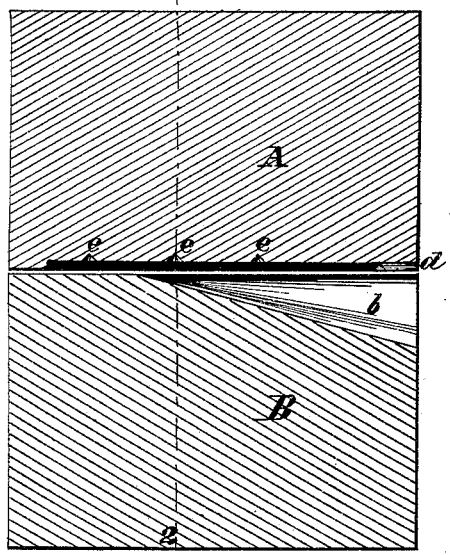
Figure 2:
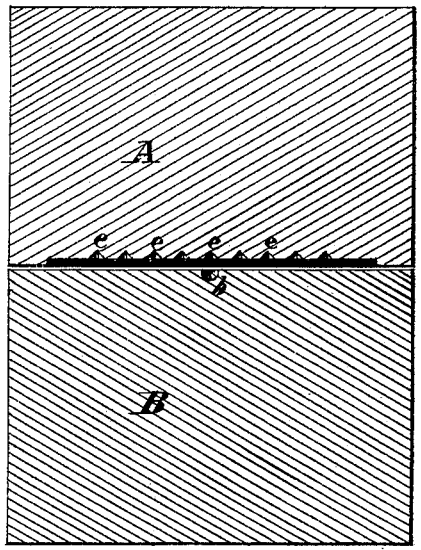
Figure 3:
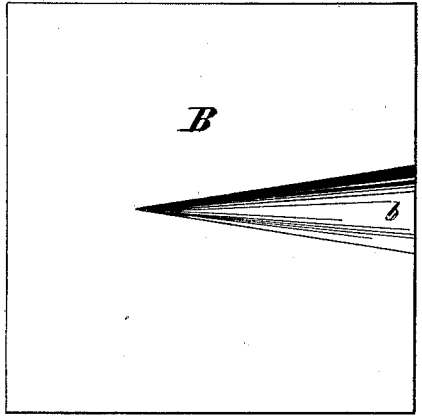
Figure 4:
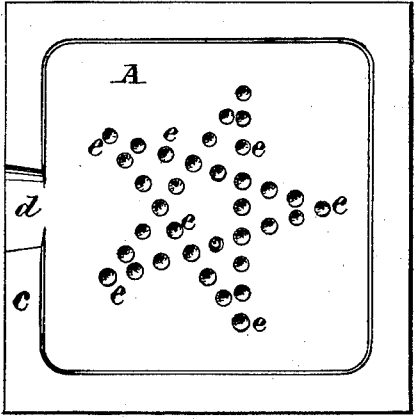
Figure 5:
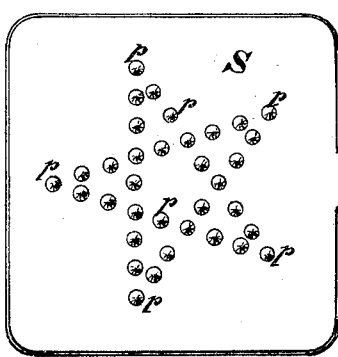
Figure 6:
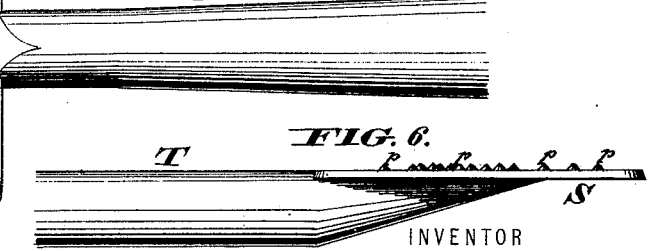

In the accompanying drawing, Figure 1 is a longitudinal section of a pair of dies illustrating the invention. Fig. 2 is a transverse section on the line 2 2, Fig. 1. Figs. 3 and 4 are face views of the respective dies. Fig. 5 is a face view of a carriage-step prepared for application to the frame by the carriage-builder. Fig. 6 is an edge view of the same.

A B represent a pair of dies. One of these dies, A, which is to form the face of the step, is provided with any desirable number of depressions, $e$, for the purpose of producing, in the finished step, points or prominences $p$, which may take the form of a star, as here indicated, or any other preferred shape, to suit the taste, and are for the purpose of affording a hold to the foot to prevent slipping. The other die, B, is formed with a groove, $b$, deep at the outside and tapering inward, extending beyond the center of the face of the die, to accommodate the tang or shank of the step and the strengthening-ridge, where this unites with the step. The cavity, to accommodate the thickness of the step, is made in either or both of the dies, in customary manner. In the present illustration it is shown in the face of the die A, a groove being formed at $d$ in the marginal ridge $c$, to accommodate the face of the tang T, Figs. 5 and 6.

Operation: A blank, being prepared in approximately the required shape, is placed between the dies A B, with its tang T projecting outward through the grooves $b$ $d$. The stamping is then performed by a drop-press or other suitable means. The effect is to produce a step, S, of required shape and design, as illustrated, for example, in Fig. 5, the tang T extending therefrom, in readiness for welding to the shank or support by which it is connected to the frame of the carriage, in customary manner.

Having thus described my invention, what I claim as new, and desire to secure by Letters Patent, is—

The dies constructed and operating as herein described, for the purpose of forming carriage-steps with raised points of any preferred design.

DARIUS WILCOX.

Witnesses:
CHAS. E. CLARK,
W. S. BROWNE.